United States Patent
Freudigmann et al.

(10) Patent No.: US 12,152,732 B2
(45) Date of Patent: Nov. 26, 2024

(54) TANK DEVICE FOR TEMPERATURE PRESSURE RELIEF IN A FUEL CELL TANK

(71) Applicant: Robert Bosch GmbH, Stuttgart (DE)

(72) Inventors: Hans-Arndt Freudigmann, Tuebingen (DE); Bernd Stuke, Leonberg (DE); Olaf Ohlhafer, Erligheim (DE)

(73) Assignee: Robert Bosch GmbH, Stuttgart (DE)

( * ) Notice: Subject to any disclaimer, the term of this patent is extended or adjusted under 35 U.S.C. 154(b) by 102 days.

(21) Appl. No.: 18/248,745

(22) PCT Filed: Oct. 1, 2021

(86) PCT No.: PCT/EP2021/077140
§ 371 (c)(1),
(2) Date: Apr. 12, 2023

(87) PCT Pub. No.: WO2022/084005
PCT Pub. Date: Apr. 28, 2022

(65) Prior Publication Data
US 2023/0400156 A1 Dec. 14, 2023

(30) Foreign Application Priority Data
Oct. 21, 2020 (DE) ...................... 10 2020 213 268.2

(51) Int. Cl.
*F17C 13/04* (2006.01)
*H01M 8/04* (2016.01)
(Continued)

(52) U.S. Cl.
CPC ......... *F17C 13/04* (2013.01); *H01M 8/04201* (2013.01); *B60K 15/03006* (2013.01);
(Continued)

(58) Field of Classification Search
CPC .......................... F17C 13/04; H01M 8/04201
See application file for complete search history.

(56) References Cited

U.S. PATENT DOCUMENTS

| | | |
|---|---|---|
| 6,418,962 B1 | 7/2002 | Wozniak et al. |
| 2019/0047410 A1 | 2/2019 | Kataoka et al. |

(Continued)

FOREIGN PATENT DOCUMENTS

| | | |
|---|---|---|
| DE | 102017212485 A1 | 1/2019 |
| DE | 102018116090 A1 | 2/2019 |

(Continued)

OTHER PUBLICATIONS

Translation of International Search Report for Application No. PCT/EP2021/077140 dated Jan. 4, 2022 (2 pages).

*Primary Examiner* — Kevin R Barss
(74) *Attorney, Agent, or Firm* — Michael Best & Friedrich LLP

(57) ABSTRACT

A tank device for temperature pressure relief in a fuel cell tank, the tank device comprising at least two tank containers and a supply line which can be connected to the tank containers, each of the at least two tank containers having at least one shutoff valve at one end, the shutoff valve being arranged between the respective tank container and the supply line. At least one safety valve is arranged at another end of the tank container, wherein at least the at least two tank containers and the respective safety valve are at least almost completely enclosed by a housing element and/or are encapsulated from an environment. A positive pressure prevails in the housing element, wherein the housing element contains a temperature-sensitive material, wherein the meltable medium of the safety valve melts when the pressure prevailing in the inner space falls, and thus opens the safety valve.

17 Claims, 3 Drawing Sheets

(51) Int. Cl.
*H01M 8/04082* (2016.01)
*B60K 15/03* (2006.01)

(52) U.S. Cl.
CPC ............ *B60K 2015/03315* (2013.01); *F17C 2205/0111* (2013.01); *F17C 2205/0134* (2013.01); *F17C 2205/0332* (2013.01); *F17C 2205/0352* (2013.01); *F17C 2221/012* (2013.01); *F17C 2250/043* (2013.01); *F17C 2270/0168* (2013.01); *F17C 2270/0184* (2013.01); *H01M 2250/20* (2013.01)

(56) References Cited

U.S. PATENT DOCUMENTS

| | | |
|---|---|---|
| 2020/0191335 A1 | 6/2020 | Kataoka |
| 2024/0102618 A1* | 3/2024 | Freudigmann .... H01M 8/04201 |
| 2024/0302002 A1* | 9/2024 | Muehleder ............. F17C 13/04 |

FOREIGN PATENT DOCUMENTS

| | | |
|---|---|---|
| DE | 102018209057 A1 | 12/2019 |
| JP | 2011085167 A | 4/2011 |
| JP | 2011106620 A | 6/2011 |
| JP | 2013076433 A | 4/2013 |
| JP | 2019032051 A | 2/2019 |
| JP | 2019032055 A | 2/2019 |

\* cited by examiner

TANK DEVICE FOR TEMPERATURE PRESSURE RELIEF IN A FUEL CELL TANK

BACKGROUND OF THE INVENTION

The invention relates to a tank device for temperature pressure relief in a fuel cell tank, in particular for the storage of hydrogen, for example for use in vehicles with a fuel cell drive.

DE 10 2017 212 485 A1 describes a device for storing compressed fluids which are used as fuel for a vehicle, wherein the device comprises at least two tubular tank modules and at least one high-pressure fuel allocator having at least one integrated regulating and safety technology. In addition, the at least two tubular tank modules are made of metal and are connected in a modular manner to a module in flexible geometry with the at least one high-pressure fuel allocator having the at least one integrated regulating and safety technology.

The safety devices for such a device as shown in DE 10 2017 212 485 A1 are standardized. Here, each tank module must have an overflow valve that can be automatically shut off and a safety valve. For example, in the event of an accident with the device for storing compressed fluids or in the case of a line within the device fracturing, the overflow valve can close so that no gas can escape from the storage unit. Furthermore, the safety valve is intended to ensure, for example in the event of a fire or a temperature increase beyond a predetermined threshold value, that for example the hydrogen can be discharged from the tank module in order to prevent an explosion of the tank module or even of the entire device for storing compressed fluids.

These safety precautions call for a plurality of valves, as a result of which the complexity of the entire gas storage system and also its costs are increased. Furthermore, depending on the position of the safety valve, it must be ensured that, when the source of the fire is not in the vicinity of the safety valve, said valve also triggers in order to prevent a possible explosion of the gas storage system.

SUMMARY OF THE INVENTION

In contrast, the tank device according to the invention has the advantage that a local heat source at the tank device is quickly and reliably detected in a structurally simple manner in order to ensure reliable opening of the safety valves.

For this purpose, the tank device for temperature pressure relief in a fuel cell tank comprises at least two tank containers and a supply line which can be connected to the tank containers. Each of the at least two tank containers has at least one shutoff valve at one end, said shutoff valve being arranged between the respective tank container and the supply line. At least one safety valve is also arranged at another end of the tank container. Furthermore, at least the at least two tank containers and the respective safety valve are at least almost completely enclosed by a frame-shaped housing element and/or are encapsulated, in particular in a pressure-tight manner, from an environment. In this case, a positive pressure, in particular in relation to the environment and/or to an ambient pressure, prevails in the housing element, in particular an inner space. The housing element contains a temperature-sensitive material, in particular plastic, wherein the safety valve opens when the pressure, in particular the positive pressure, prevailing in the inner space, falls.

This ensures that the respective safety valve also reliably opens in an emergency, such as an accident with a broken-out fire, in order to release the stored hydrogen from the tank containers and thus counteract a bursting of the tank containers. The point at which the heat input acts on the tank device is irrelevant here, since in the case of heat input onto the housing element, a drop in pressure, in particular in the positive pressure, in the inner space of the housing element is generated, as a result of which the safety valves can be triggered. In this case, the frame-shaped housing element covers a large region of the vehicle, which in the case of a fire leads to the safety valves being triggered.

In a first advantageous development, it is provided that the safety valve comprises a meltable medium, such as wax, such that it is in particular a melt safety valve. In this way, a cost-effective and compact design of the safety valve can be achieved, which, in the event of an emergency, reliably opens once and in this way the hydrogen can be discharged from the region of the tank in question.

In a further embodiment of the invention, it is advantageously provided that the meltable medium of the safety valve melts in the event of a temperature increase in the environment and thus opens the safety valve. In this way, it can be ensured that, in the event of an emergency, in which an increase in temperature, for example due to a fire, occurs in the region of the vehicle and/or the tank, the meltable medium is heated, as a result of which the aggregation state changes from at least almost solid to at least almost liquid and the meltable medium moves out of the region of the safety valve, in particular a neck region, and thus the hydrogen stored in the tank container can be released therefrom and can then be discharged into the environment via a discharge line and/or a discharge valve. In a simple and reliable manner, the hydrogen from the tank containers can thus be guided into the discharge line and a bursting of the tank containers can be prevented, in particular in order to prevent an explosion hazard at the tank and thus in the overall vehicle.

In an advantageous development, it is provided that the respective safety valve has a pressure sensor which, in the event of a pressure change in the inner space, activates a heating element which heats the meltable medium of the safety valve. In this way, it can be ensured that, in the event of a pressure drop in the inner space, the meltable medium changes into an at least almost liquid state and thus opens the safety valve by the meltable medium melting so that the hydrogen can be discharged from the tank.

In a further embodiment of the invention, it is advantageously provided that the temperature-sensitive material has a melting temperature below the melting temperature of the material of the tank container. In this way, it can be ensured that the material of the housing element melts and the pressure within the housing element thus decreases, as a result of which the safety valve opens and releases the hydrogen from the at least one tank before the material of the at least one tank fails and the tank can burst. In this way, an explosion and/or a bursting of the tank can be prevented, in particular in the event of an accident and/or fire in the overall vehicle.

In an advantageous development, it is provided that at least one valve, which is in particular a pressure relief valve, is located on at least one of the at least two tank containers, wherein the valve effects a continuous release of the hydrogen from the respective tank container into the inner space. In this way, it is possible to achieve the advantage that a leakage, possibly occurring in the housing element, whereby in particular only a small quantity such as less than 1% by weight of the gas in the inner space of the housing element escapes per hour, can be compensated in such a way that this is compensated by the gas in the respective tank container and in this way the pressure in the inner space of the housing element does not fall and/or can at least be almost maintained. In this way, incorrect and unintended opening of the safety valve is prevented, in particular when there is no emergency, for example an accident with a broken-out fire, so that a release of hydrogen from the tank is prevented when there is no emergency.

In an advantageous development, it is provided that each tank container can be connected to the discharge line by means of a respective safety valve. It can thus be ensured that each tank container has its own safety valve, whereby, in the event of a malfunction of the safety valve, at least the hydrogen can still be discharged from the other tank containers.

The tank device described is preferably suitable for storing hydrogen for the operation of a fuel cell in a fuel cell system.

In advantageous uses, the tank device can be used in vehicles with a fuel cell drive.

BRIEF DESCRIPTION OF THE DRAWINGS

The drawing shows exemplary embodiments of a tank device according to the invention for temperature pressure relief in a fuel cell tank. In the drawing.

All figures are solely schematic representations of a tank device according to the invention, of the method according to the invention or of its components according to exemplary embodiments of the invention. In particular, distances and size relationships are not reproduced true to scale in the figures.

DETAILED DESCRIPTION

Figure 1:
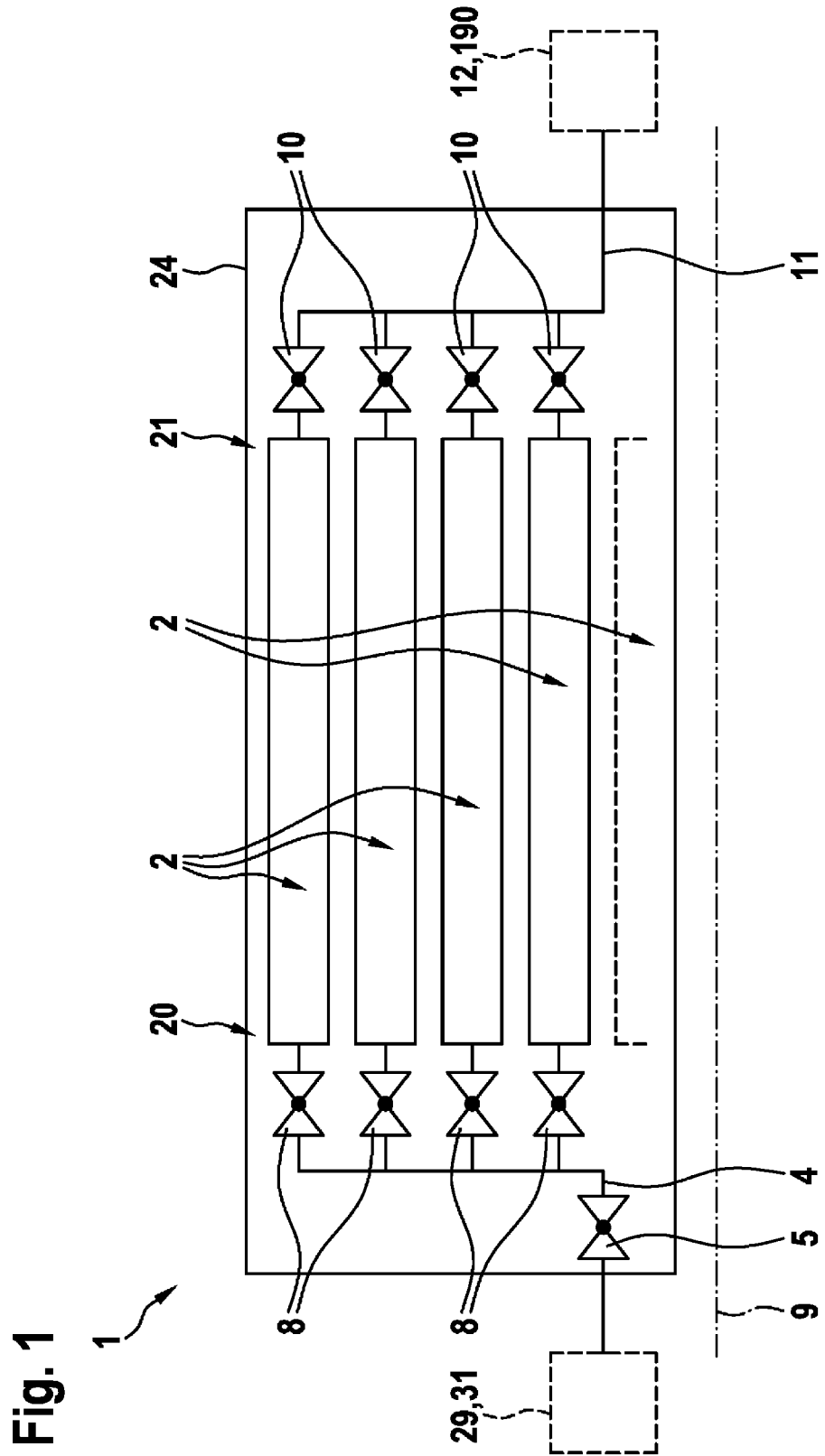
FIG. 1 is a schematic plan view of a tank device according to the invention.

FIG. 1 shows an exemplary embodiment of a tank device 1 according to the invention in a plan view. The tank device 1 has a plurality of tank containers 2, which are substantially cylindrical and made of steel.

The illustration according to FIG. 1 is a schematic plan view of the tank device 1 according to the invention for a fuel cell system 31. The tank device 1 here has at least two tank containers 2 for storing hydrogen, as well as a frame-shaped housing element 24 and a supply line 4 which can be connected to the tank containers 2. In this case, the frame-shaped housing element 24 at least partially surrounds the at least two tank containers 2 and the supply line 4, the at least two tank containers 2 extending in parallel with a longitudinal axis 9 wherein. Here, each of the at least two tank containers 2, which are substantially cylindrical and made of steel, has at least one valve 8, 10. This at least one valve 8, 10 is a shutoff valve 8 and/or a safety valve 10.

In an exemplary embodiment of the tank device 1, the at least two tank containers 2 in each case have the shutoff valve 8 at a first end 20 and the safety valve 10 at a second end 21, wherein the respective ends 20, 21 are located on the respective tank container 2 in the direction of the longitudinal axis 9. The two tank containers 2 are at least approximately tubular.

Furthermore, FIG. 1 shows that the shutoff valve 8 is arranged between the respective tank container 2 and the supply line 4, wherein the supply line 4 is located the respective tank containers 2 with the fuel cell system 31, in particular a fuel cell 29. In an exemplary embodiment of the fuel cell system 31, the hydrogen from the tank device 1, which is in particular at a high pressure of at least nearly 700 bar, can, via the supply line, 4 reach a nozzle and/or an intake region of a jet pump of the fuel cell system 31. In addition, a supply valve 5 can be located in the region of the supply line 4, in particular between the shutoff valve 8 and the fuel cell system 31, in particular an anode region of the fuel cell system 31 and/or at least indirectly with the fuel cell 29. The supply valve 5 can be located inside or outside the frame-shaped housing element 24.

In the region of the second end 21 of the respective tank container 2, on which the tank container 2 has the safety valve 10, the tank container 2 is connected via the safety valve 10 to a connecting line 11. In the event of an accident and/or a fire, the connecting line 11 is used to guide hydrogen out of the respective tank container 2 out of the tank device 1 and thus counteract a bursting of the respective tank container 2. At the end of the connecting line 11 facing away from the safety valve 10 and/or the tank container 2, in particular the downstream end thereof, there can be a discharge valve 12, via which, in the event of an accident or fire, the hydrogen can be released into an environment 190 of the vehicle, in particular into a region in which the igniting hydrogen can no longer damage the overall vehicle or injure the occupants. In a further exemplary embodiment of the tank device 1, each tank container 2 can be connected to a discharge line 11 by means of a respective safety valve 10.

In an exemplary embodiment, the safety valve 10 can be a so-called melt safety valve 10 and/or TPRD (thermal pressure relief device) valve 10, which has a melting medium such as wax, for example, in order to trigger an opening of the safety valve 10 by melting the wax in the event of a serious situation occurring during heat input onto the tank containers 2. In this way, in this exemplary embodiment, the respective tank container 2 is connected by its first end 20 to the supply line 4 via the shutoff valve 8 and/or is connected by its second end 21 to the connecting line 11 via the safety valve 10, which is designed in particular as a melt safety valve 10.

Furthermore, there can be a further valve in the region of the connecting line 11, in particular between the safety valve 10 and the discharge valve 12. This further valve and/or the discharge valve 12 may be located 5 inside or outside the frame-shaped housing element 24.

The respective ends 20, 21 of each tank container 2 have a conical taper and thus a typical bottleneck structure.

The tank device 1 shown in FIG. 1 here is used for temperature pressure relief in a fuel cell tank. According to the invention, at least the at least two tank containers 2 and the respective safety valve 10 are at least almost completely enclosed by the housing element 24 and/or are encapsulated, in particular in a pressure-tight manner, from the environment 190. A positive pressure 181, in particular in relation to the environment 190 and/or to an ambient pressure 191, prevails in the housing element 24, in particular the inner space 180. In this case, the pressure difference between the positive pressure 181 in the inner space 180 and the ambient pressure 191 of the environment 190 can be, for example, at least 0.1 bar, wherein the environment 190 can also be the environment 190 outside the overall vehicle. The housing element 24 contains at least one temperature-sensitive material 25, in particular plastic. A meltable medium 71 of the safety valve 10 can melt when there is a drop in the pressure, in particular the positive pressure 181, prevailing in the inner space 180, and thus open the safety valve 10. Here the chain of action mechanisms is that, in the event of a fire or a temperature increase due to an accident in the region of the tank device 1 and/or of the overall vehicle at any location on the housing element 24, such a temperature input takes place that the temperature-sensitive material 25 melts and there is thus an opening in the housing element 24 through which the gaseous medium escapes from the inner space 180, in particular into the environment 190, and the overpressure 181 is thereby reduced and at least almost equalized with the ambient pressure 191. As a result of the pressure drop in the inner space 180, the safety valve 10 now opens, at least indirectly, and guides the hydrogen in the tank container 2 out of the tank device 1 via the discharge line 11 and the discharge valve 12, so that the hydrogen for the tank device 1 and the overall vehicle is not endangered, for example by a fire which is triggered by an accident. It is advantageous here that, due to the embodiment of the tank device 1 according to the invention, the safety valve 10 does not only trigger when said valve opens due to the temperature input of the fire directly at the safety valve 10, but that the region is enlarged, in which region a temperature input due to a fire leads to an opening of the safety valve 10, for example in the region of the entire frame-shaped housing element 24. In this way, the hydrogen can be discharged earlier from the respective point in time before it reaches the safety valve 10 and/or the respective tank container 2. This reduces the risk of a serious accident due to the hydrogen ignited by the fire and or a bursting of the tank containers 2, since the hydrogen can already be discharged much earlier from the tank device 1 and/or the overall vehicle.

The mode of operation of the tank device 1 is as follows: During proper functioning of the fuel cell system 31, the fuel cell 29 is supplied with hydrogen from the tank containers 2. In this case, the shutoff valves 8 are designed such that a safe supply to the fuel cell 29 is ensured.

If a heat input—for example, caused by fire—to the tank device 1 or the tank containers 2 occurs, the safety valves 10 should be triggered as quickly as possible after the occurrence of the heat input, so that the hydrogen can be guided out of the tank containers 2 in order to prevent an explosion of the tank containers 2, for example. In this case, the power supply to the shutoff valves 8 is generally also interrupted so that no more hydrogen can escape from the tank containers 2.

In order to ensure that the safety valves 10 also trigger when, for example, a heat input does not occur in the vicinity of the safety valves 10, for example a heat input occurs at the first end 20 of the tank container 2, the embodiment according to the invention of the tank device 1 with the positive pressure 181 within the housing element 24 ensures a reliable opening of the safety valves 10.

Figure 2:
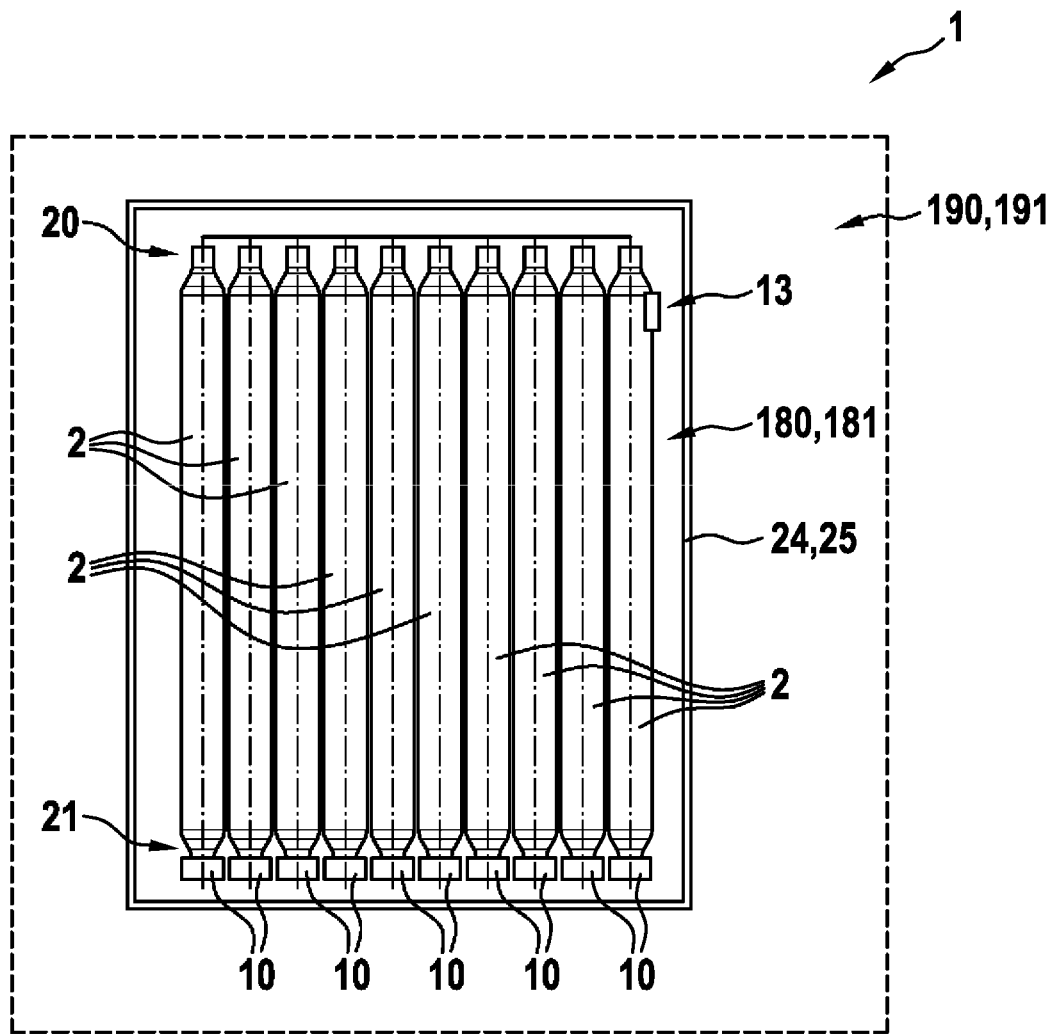
FIG. 2 is a plan view of the tank device according to the invention with at least two tank containers and a surrounding frame-shaped housing element.

FIG. 2 shows a plan view of the tank device 1 according to the invention with at least two tank containers 2 and the surrounding frame-shaped housing element 24. In one exemplary embodiment of the tank device 1, the respective safety valves 10 can be located at a geodetically lowest point of the tank device 1. In this case, the safety valve 10 comprises the meltable medium 71, for example wax 71, and therefore it is in particular a melt safety valve 10. Furthermore, the meltable medium 71 of the safety valve 7 melts in the event of a temperature increase of the environment 190, as a result of which the safety valve 10 opens. The frame-shaped housing element 24 here comprises the temperature-sensitive material 25, wherein the melting temperature of the temperature-sensitive material 25 is below the melting temperature of the material of the respective tank container 2.

Furthermore, FIG. 2 shows that at least one valve 13, which is in particular a pressure relief valve 13, is located on at least one of the at least two tank containers 2, wherein the valve 13 effects a continuous release of the hydrogen from the respective tank container 2 into the inner space 180. In the case of a possible leakage at the housing element 24, wherein a small quantity of the gas in the inner space 180 escapes into the environment 190, this can be compensated by means of the gas in the tank container 2, which gas is guided into the inner space 180 via the valve 13. In this case, the positive pressure 181 is prevented from falling when there is no accident and/or fire, and the safety valve 10 would thus be triggered. This can in particular be the case when a leakage is present due to a small puncture in the housing element 24. In this case, the pressure level within the inner space 180 is maintained.

Figure 3:
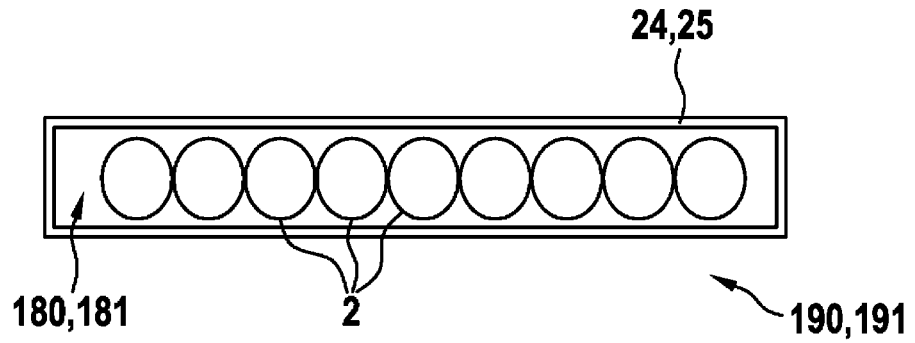
FIG. 3 is a side view of the tank device according to the invention with at least two tank containers and the surrounding frame-shaped housing element.

FIG. 3 shows a side view of the tank device 1 according to the invention with at least two tank containers 2 and the surrounding frame-shaped housing element 24. It is shown here that the tank containers 2 are arranged next to one another in one plane, wherein the housing element 24 surrounds the tank containers 2 and a positive pressure 181 is produced in the inner space 180 of the housing element 24, in particular in relation to the ambient pressure 191.

Figure 4:
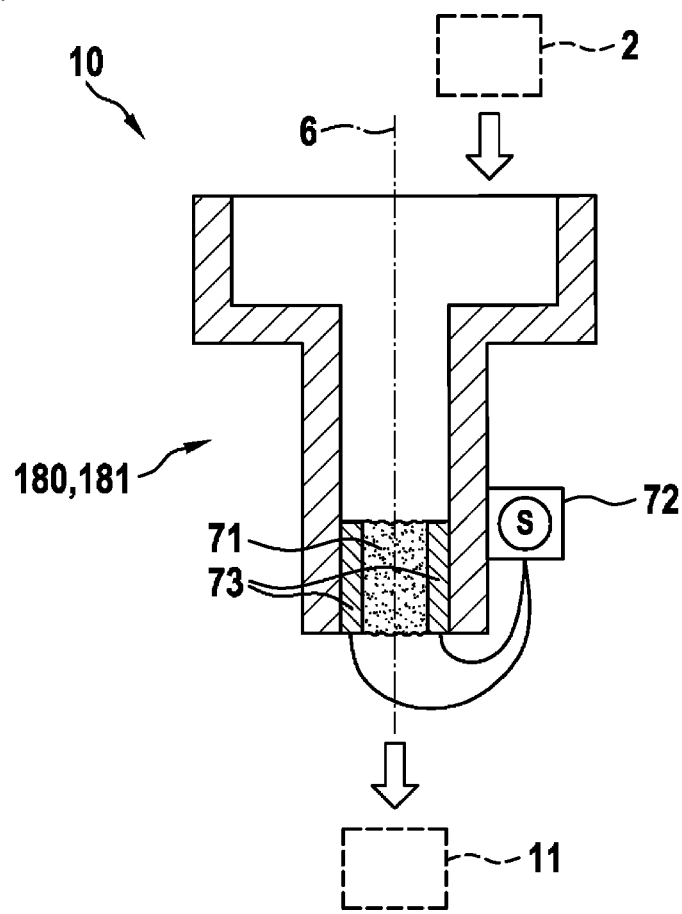
FIG. 4 is a sectional view of a safety valve.

FIG. 4 shows an exemplary embodiment of the tank device 1 and/or of the safety valve 10, the respective safety valve 10 having a pressure sensor 72 which, in the event of a pressure change in the inner space 180, activates a heating element 73 which heats the meltable medium 71 of the safety valve 10. Here, the sensor 72 is connected to the heating element 73, for example by means of a cabling; as soon as the pressure, in particular positive pressure 181, in the inner space 180 falls below a limit value, the sensor 72 controls the heating element 73 and/or supplies the heating element 73 with energy. The meltable medium 71 then melts due to the temperature input, flows away in particular in the direction of a discharge line 11 and thus opens the safety valve 10 so that the hydrogen can escape from the tank container 2. In this case, the heating element 73 can be designed in the shape of a sleeve around a central axis 6, the meltable medium 71 thus being inside the heating element 73.

The opening of the respective safety valve 10 is irreversible in all exemplary embodiments, since in the event of fire the tank containers 2 are emptied quickly and efficiently and the safety valve 10 should remain in the open state in order to ensure complete emptying.

The invention claimed is:

1. A tank device (1) for temperature pressure relief in a fuel cell tank, the tank device (1) comprising at least two tank containers (2) and a supply line (4) configured to be connected to the tank containers (2), each of the at least two tank containers (2) having at least one shutoff valve (8) at one end (20), said shutoff valve (8) being arranged between the respective tank container (2) and supply line (4), at least one respective safety valve (10) being arranged at another end (21) of the tank container (2), characterized in that the at least two tank containers (2) and the respective safety valves (10) are at least almost completely enclosed by a housing element (24) and/or are encapsulated from an environment (190), a positive pressure (181) prevailing in the housing element (24), the housing element (24) containing a temperature-sensitive material (25), the safety valves (10) opening when the pressure prevailing in the inner space (180) falls.

2. The tank device (1) according to claim 1, characterized in that the respective safety valve (10) comprises a meltable medium (71).

3. The tank device (1) according to claim 2, characterized in that the meltable medium (71) of the respective safety valve (10) melts in the event of a temperature increase in the environment (190) and thus opens the respective safety valve (10).

4. The tankTank device (1) according to claim 2, characterized in that the housing element (24) has an inner space (180), and the respective safety valve (10) has a pressure sensor (72) which, in the event of a pressure change in the inner space (180), activates a heating element (73) which heats the meltable medium (71) of the safety valve (10).

5. The tank device (1) according to claim 1, characterized in that the temperature-sensitive material (25) has a melting temperature below the melting temperature of a material of the tank container (2).

6. The tank device (1) according to claim 1, characterized in that the housing element (24) has an inner space (180), and at least one additional valve (13), is located on at least one of the at least two tank containers (2), the additional valve (13) effecting a continuous release of the hydrogen from the respective tank container (2) into the inner space (180).

7. The tank device (1) according to claim 1, characterized in that each tank container (2) is configured to be connected to a discharge line (11) by the respective safety valve (10).

8. A fuel cell system (31) comprising a tank device (1) according to claim 1.

9. A fuel-cell-powered vehicle comprising a tank device (1) according to claim 1.

10. A tank device (1) for temperature pressure relief in a fuel cell tank, the tank device (1) comprising at least two tank containers (2) and a supply line (4) configured to be connected to the tank containers (2), each of the at least two tank containers (2) having at least one shutoff valve (8) at one end (20), said shutoff valve (8) being arranged between the respective tank container (2) and supply line (4), at least one respective safety valve (10) being arranged at another end (21) of the tank container (2), characterized in that the at least two tank containers (2) and the respective safety valves (10) are at least almost completely enclosed by a housing element (24) and/or are encapsulated in a pressure-tight manner, from an environment (190), a positive pressure (181) in relation to the environment (190) and/or to an ambient pressure (191) prevailing in the an inner space (180) of the housing element (24), the housing element (24) containing a temperature- sensitive material (25), which is plastic, the safety valves (10) opening when the positive pressure (181) prevailing in the inner space (180) falls.

11. The tank device (1) according to claim 10, characterized in that the respective safety valve (10) comprises a meltable wax (71), so that the respective safety valve (10) is a melt safety valve (10).

12. The tank device (1) according to claim 11, characterized in that the meltable medium (71) of the respective safety valve (10) melts in the event of a temperature increase in the environment (190) and thus opens the respective safety valve (10).

13. The tank device (1) according to claim 12, characterized in that the temperature-sensitive material (25) has a melting temperature below the melting temperature of a material of the tank container (2).

14. The tank device (1) according to claim 11, characterized in that the housing element (24) has an inner space (180), and the respective safety valve (10) has a pressure sensor (72) which, in the event of a pressure change in the inner space (180), activates a heating element (73) which heats the meltable medium (71) of the safety valve (10).

15. The tank device (1) according to claim 14, characterized in that the temperature-sensitive material (25) has a melting temperature below the melting temperature of a material of the tank container (2).

16. The tank device (1) according to claim 10, characterized in that the housing element (24) has an inner space (180), and at least one additional valve (13), which is a pressure relief valve (13), is located on at least one of the at least two tank containers (2), the additional valve (13) effecting a continuous release of the hydrogen from the respective tank container (2) into the inner space (180).

17. The tank device (1) according to claim 10, characterized in that each tank container (2) is configured to be connected to a discharge line (11) by the respective safety valve (10).

* * * * *